June 16, 1925.

A. SWEITZER 1,542,744

AUTOMOBILE STEERING GEAR

Filed Sept. 22, 1924

August Sweitzer, INVENTOR

BY Victor J. Evans

ATTORNEY

WITNESS: P. J. Hickey.

Patented June 16, 1925.

1,542,744

UNITED STATES PATENT OFFICE.

AUGUST SWEITZER, OF FORT WAYNE, INDIANA.

AUTOMOBILE STEERING GEAR.

Application filed September 22, 1924. Serial No. 739,232.

*To all whom it may concern:*

Be it known that I, AUGUST SWEITZER, a citizen of the United States, residing at Fort Wayne, in the county of Allen and State of Indiana, have invented new and useful Improvements in Automobile Steering Gears, of which the following is a specification.

My present invention pertains to automobile steering gear constructed with a view to stabilizing the steering mechanism and with a view to preventing the transmission of shock and jar to the steering wheel incident to the traverse of a rough road.

The object of my said invention is the provision of a steering gear of the kind stated that is highly efficient in operation, is susceptible of ready application to automobiles at present in use, and is well adapted to withstand the shocks and strains to which devices of corresponding character are ordinarily subjected.

To the attainment of the foregoing, the invention consists in the improvement as hereinafter described and definitely claimed.

In the accompanying drawings, forming part of this specification:—

Similar numerals designate corresponding parts in all of the views of the drawings.

Figure 1:
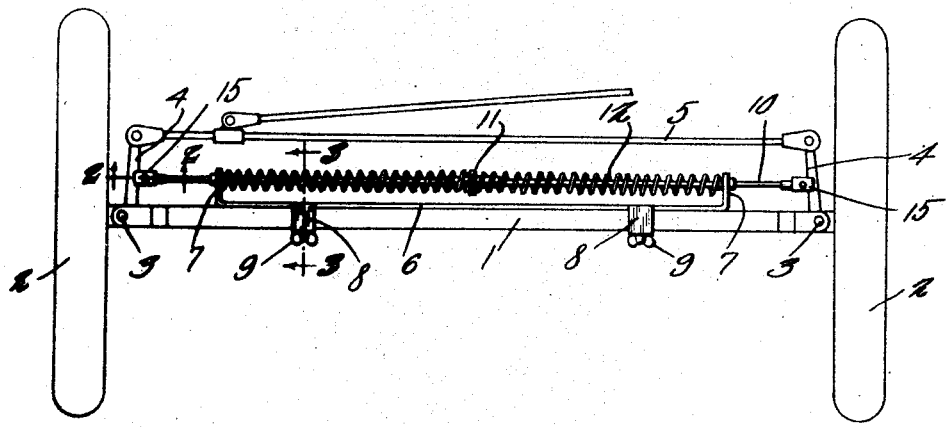
Figure 1 is a plan view showing the application of my improvement to the front axle and the steering mechanism of an automobile.
Figure 2:
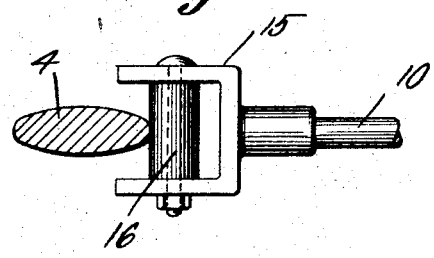
Figure 2 is an enlarged fragmentary section taken in the plane indicated by the line 2—2 of Figure 1.

I illustrate in Figure 1 the front axle 1 of an automobile, and I also illustrate the front wheels 2 of an automobile which are carried on knuckles pivotally connected at 3 to the axle 1 and provided with the usual rearwardly extending arms 4 between which is interposed and connected the usual rod 5 for connection with a steering wheel not illustrated. All of these parts may be of the ordinary well known construction as illustrated or may be of any other construction compatible with the purpose of my invention without affecting the latter.

Figure 3:
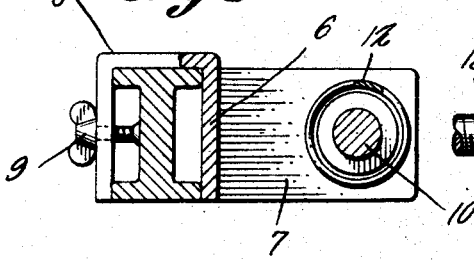
Figure 3 is an enlarged vertical section taken on the line 3—3 of Figure 1.
Figure 4:
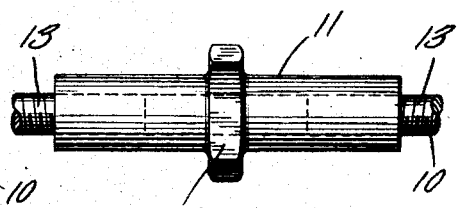
Figure 4 is a detail view on an enlarged scale of the turn buckle comprised in my improvement.

Among other elements my improvement comprises a metallic body 6 adapted to be arranged in parallelism to and back of and against the axle 1 as appears in Figures 1 and 3. At its ends the said body 6 is provided with rearwardly directed apertured arms 7, and at intermediate points of its length the body is provided with hooks 8, arranged as shown in Figure 3 relative to the axle 1 and fixed to the said axle 1 through the medium of clamping screws 9.

In addition to the body 1 my improvement comprises thrust rods 10, a turn buckle 11, and coiled springs 12. The thrust rods 10 are guided in and movable rectilinearly through the apertured arms 7 of the body 6 and are threaded at 13 to engage in the turn buckle 11 which is provided with an intermediate enlarged portion 14 preferably of angular configuration to facilitate turning in adjustment of the turn buckle when ooccasion demands.

The springs 12 surround the rods 10 and are interposed between the body arms 7 and the enlargement 14 of the turn buckle so that the said springs are adapted to adequately cushion the rods 10 when the same are moved rectilinearly in opposite directions. From this it follows that the springs 12 will absorb shocks and jars when the wheels 2 are traversing a rough road and in that way will prevent the transmission of such shocks and jars to the steering wheel so as to render the steering of an automobile very easy.

At their outer ends the rods 10 are provided with yokes 15 in which anti-friction rollers 16 are mounted. These rollers 16 bear outwardly against the knuckle arms 4 so that movement of the thrust means between the arms 4 will attend swinging movement of the arms 4, the thrust means being cushioned in one direction by one spring and in the other direction by the other spring, and the rollers 16 being maintained at all times in contact with the knuckle arms 4.

It will be apparent from the foregoing that my improvement will efficiently serve the function ascribed to it; also, that the improvement as a whole will be expeditiously and easily applied to the front axle of an automobile without the assistance of skilled labor.

I have specifically described the preferred embodiment of my invention in order to impart a definite understanding of said embodiment. I do not desire, however, to be understood as confining myself to the exact construction, my invention being defined by my appended claims within the scope of which changes or modifications may be made without departure from my invention.

Having described my invention, what I claim and desire to secure by Letters-Patent, is:—

1. In steering gear for an automobile, the combination of a front axle, knuckles pivoted thereto and carrying ground wheels and having opposite arms, a body fixed to the front axle, thrust means guided in said body and opposed at its ends to the said knuckles arms and having an intermediate abutment, and springs interposed between the said abutment and body portions located between the said abutment and the said knuckle arms; the said thrust means including rods guided in said body portions, and a turn buckle connecting the said rods and having an enlarged portion constituting an abutment for the inner ends of the springs.

2. In steering gear for an automobile, the combination of a front axle, knuckles pivoted thereto and carrying ground wheels and having opposite arms, a body having arms at its ends and also having hooks resting over the axle, clamping means carried by said hooks and engaging the axle, thrust means interposed between and opposed to the knuckle arms and guided in the body arms and having an intermediate abutment, and springs surrounding said thrust means and interposed between the body arms and the abutment of the thrust means.

3. In steering gear for an automobile, the combination of a front axle, knuckles pivoted thereto and carrying ground wheels and having opposite arms, a body fixed to the front axle, thrust means guided in said body and opposed at its ends to the said knuckle arms and having an intermediate abutment, and springs interposed between the said abutment and body portions located between the said abutment and the said knuckle arms; the said thrust means being provided at its ends with yokes that straddle the knuckle arms, and anti-friction rollers mounted in said yokes and disposed against said arms.

In testimony whereof I affix my signature.

AUGUST SWEITZER.